(12) United States Patent
Zhang et al.

(10) Patent No.: US 11,302,350 B1
(45) Date of Patent: Apr. 12, 2022

(54) MAGNETIC RECORDING HEAD HAVING A WRAP-AROUND SHIELD COMPRISING A LAMINATED FILM AND A MAGNETIC RECORDING DEVICE COMPRISING THE MAGNETIC RECORDING HEAD

(71) Applicant: Western Digital Technologies, Inc., San Jose, CA (US)

(72) Inventors: Yifan Zhang, San Jose, CA (US); Ming Sun, San Jose, CA (US); Ming Jiang, San Jose, CA (US); William Sides, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/179,173

(22) Filed: Feb. 18, 2021

(51) Int. Cl.
*G11B 5/11* (2006.01)
*G11B 5/31* (2006.01)

(52) U.S. Cl.
CPC ............... *G11B 5/315* (2013.01); *G11B 5/11* (2013.01); *G11B 5/3163* (2013.01)

(58) Field of Classification Search
None
See application file for complete search history.

(56) References Cited

U.S. PATENT DOCUMENTS

| | | | |
|---|---|---|---|
| 6,233,116 B1 | 5/2001 | Chen et al. | |
| 7,113,367 B2 | 9/2006 | Yazawa et al. | |
| 7,777,989 B2 | 8/2010 | Sun et al. | |
| 8,824,102 B2 | 9/2014 | Sasaki et al. | |
| 9,466,319 B1 | 10/2016 | Tang et al. | |
| 10,102,871 B1* | 10/2018 | Basu et al. | G11B 5/315 |
| 10,522,178 B1* | 12/2019 | Liu et al. | G11B 5/315 |
| 2005/0213259 A1 | 9/2005 | Biskeborn | |
| 2017/0076742 A1* | 3/2017 | Tang et al. | G11B 5/315 |
| 2018/0144768 A1* | 5/2018 | Liu et al. | G11B 5/315 |

(Continued)

OTHER PUBLICATIONS

Jiang, Hai et al., "High moment FeRhN/NiFe laminated thin films for write head applications", Journal of Applied Physics, vol. 91, Issue 10, May 15, 2002, pp. 6821-6823.

(Continued)

*Primary Examiner* — Craig A. Renner
(74) *Attorney, Agent, or Firm* — Patterson & Sheridan, LLP; Steven H. Versteeg

(57) ABSTRACT

The present disclosure is generally related to a magnetic media drive employing a magnetic recording head. The magnetic recording head comprises a main pole and a wrap-around shield surrounding at least two sides of the main pole at a media facing surface. The wrap-around shield comprises an electroplated, laminated NiFeX film, where X is one of Re, Cr, or Ir. The NiFeX film comprises about 1 atomic percent to about 12 atomic percent of X, about 30 atomic percent to about 50 atomic percent of Ni, and balance of Fe. The NiFeX film comprises a plurality of layers, each layer comprising a first sublayer having a Re content of about 1 atomic percent to about 43 atomic percent and a second sublayer having a Re content of about 0 atomic percent to about 12 atomic percent. The NiFeX film increases the damping constant of the magnetic recording head.

20 Claims, 7 Drawing Sheets

(56) References Cited

U.S. PATENT DOCUMENTS

2019/0112722 A1* 4/2019 Gong et al. ............ G11B 5/858

OTHER PUBLICATIONS

Liao, S., "High moment CoFe thin films by electrodeposition", IEEE Transactions on Magnetics, vol. 23, Issue 5, Sep. 1987, Abstract only.

Chen, Y. et al., "High Moment Materials and Fabrication Processes for Shielded Perpendicular Write Head Beyond 200 GB/in2", IEEE Transactions on Magnetics, vol. 43, Issue 2, Feb. 2007, pp. 609-614.

Cooper, E. I. et al., "Recent developments in high-moment electroplated materials for recording heads", IBM Journal of Research and Development, vol. 49, Issue 1, Jan. 2005, Abstract only.

* cited by examiner

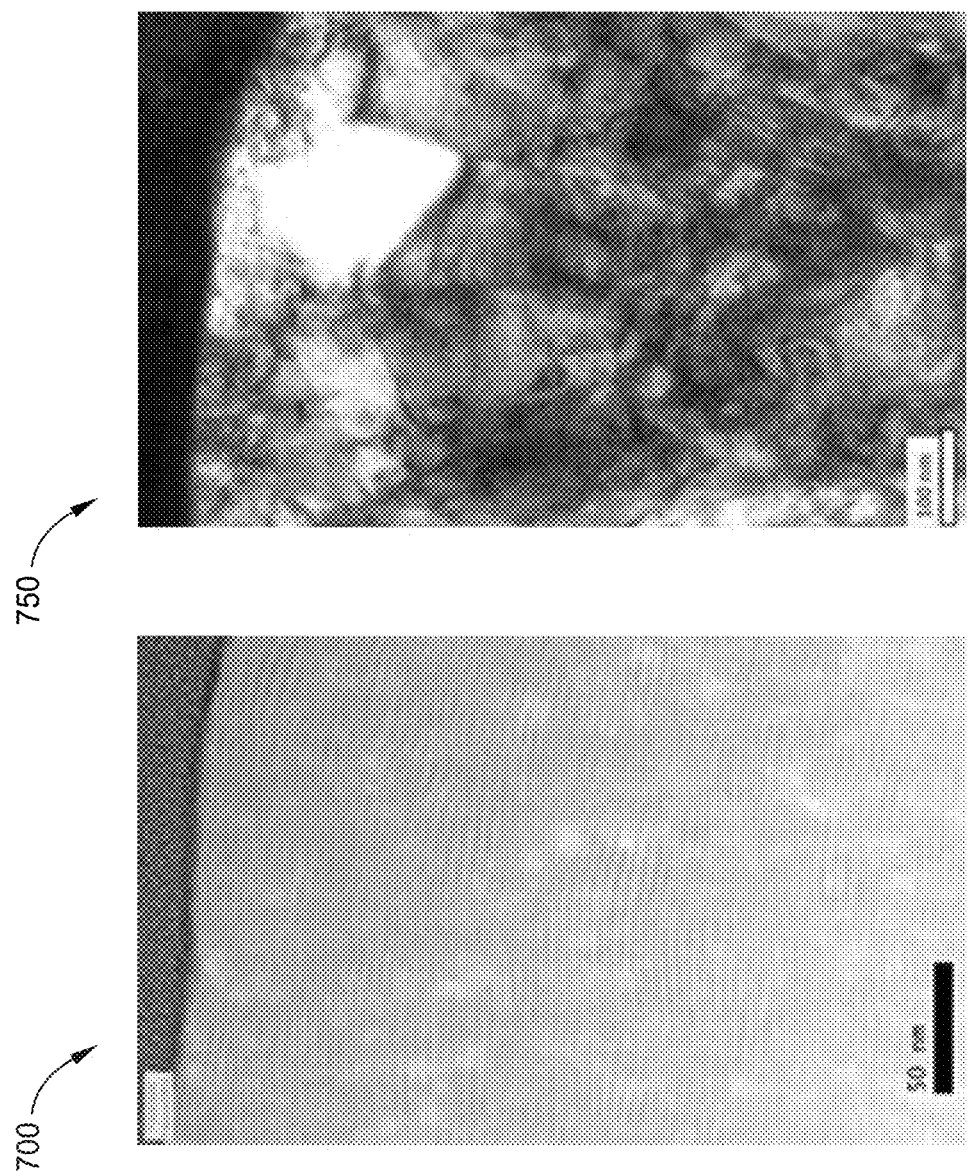

MAGNETIC RECORDING HEAD HAVING A WRAP-AROUND SHIELD COMPRISING A LAMINATED FILM AND A MAGNETIC RECORDING DEVICE COMPRISING THE MAGNETIC RECORDING HEAD

BACKGROUND OF THE DISCLOSURE

Field of the Disclosure

Embodiments of the present disclosure generally relate to data storage devices, and more specifically, to a magnetic media drive employing a magnetic recording head.

Description of the Related Art

Over the past few years, various magnetic recording methods have been studied to improve the areal density of a magnetic media device, such as a hard disk drive (HDD). Magnetic recording heads, or write heads, in HDDs can have a significant effect on the overall performance and reliability of the recording device. Magnetic recording heads may be designed to achieve specific advantages, such as improved performance, but may consequently have a negative impact on other characteristics, such as decreased reliability.

For example, some magnetic recording head designs use various shields around a main pole, such as side shields, leading shields, and trailing shields, to conduct the main pole edge flux for improved pole tip flux gradient. However, in such designs, the typical shields comprising soft magnetic alloys like NiFe, CoNiFe, etc. often show the side-track erasure of the media due to flux leakage from such shields. As a result, the areal density recording of the magnetic recording head suffers, and the overall reliability of the magnetic recording head decreases.

Therefore, there is a need in the art for a magnetic recording head having improved shields.

SUMMARY OF THE DISCLOSURE

The present disclosure is generally related to a magnetic media drive employing a magnetic recording head. The magnetic recording head comprises a main pole and a wrap-around shield surrounding at least two sides of the main pole at a media facing surface. The wrap-around shield comprises an electroplated, laminated NiFeX film, where X is one of Re, Cr, or Ir. The NiFeX film comprises about 1 atomic percent to about 12 atomic percent of X, about 30 atomic percent to about 50 atomic percent of Ni, and balance of Fe. The NiFeX film comprises a plurality of layers, each layer comprising a first sublayer having a Re content of about 1 atomic percent to about 43 atomic percent and a second sublayer having a Re content of about 0 atomic percent to about 12 atomic percent. The NiFeX film increases the damping constant of the magnetic recording head.

In one embodiment, a magnetic recording head comprises a main pole, and a wrap-around shield surrounding at least two sides of the main pole, the wrap-around shield comprising a laminated film of NiFeX, CoFeX, or CoNiFeX, where X is one of Re, Cr, or Ir, wherein the laminated film comprises about 1 atomic percent to about 12 atomic percent of X, wherein when the laminated film is of NiFeX or CoNiFeX, the laminated film comprises about 30 atomic percent to about 50 atomic percent of Ni, and wherein when the laminated film is of CoFeX, the laminated film comprises about 30 atomic percent to about 50 atomic percent of Co.

In another embodiment, a magnetic recording head comprises a main pole disposed at a media facing surface, and a wrap-around shield surrounding at least two sides of the main pole at the media facing surface, the wrap-around shield comprising a laminated film of NiFeX, CoFeX, or CoNiFeX, where X is one of Re, Cr, or Ir, wherein the laminated film comprises a plurality of layers, each layer comprising a first sublayer having a X content of about 1 atomic percent to about 43 atomic percent and a second sublayer having a X content of about 0 atomic percent to about 12 atomic percent, wherein the first sublayer has a higher X content than the second sublayer.

In another embodiment, a magnetic recording head comprises a main pole, a trailing shield disposed adjacent to a first surface of the main pole, a leading shield disposed adjacent to a second surface of the main pole opposite the first surface, and side shields disposed adjacent to a third surface of the main pole and a fourth surface of the main pole disposed opposite to the third surface, the side shields comprising a laminated film of NiFeX, CoFeX, or CoNiFeX, where X is one of Re, Cr, or Ir, wherein the laminated film comprises a plurality of layers, each layer comprising a first sublayer and a second sublayer, the first sublayer having a higher X content than the second sublayer, and wherein the first sublayers and the second sublayers alternate.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 7A shows a TEM images—of the crystalline structure of the laminated NiFeRe thin film structure of FIG. 4A, according to one embodiment.

FIG. 7B shows a TEM image of the crystalline structure of a conventional NiFeRe film, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure is generally related to a magnetic media drive employing a magnetic recording head. The magnetic recording head comprises a main pole and a wrap-around shield surrounding at least two sides of the main pole at a media facing surface. The wrap-around shield comprises an electroplated, laminated NiFeX film, where X is one of Re, Cr, or Ir. The NiFeX film comprises about 1 atomic percent to about 12 atomic percent of X, about 30 atomic percent to about 50 atomic percent of Ni, and balance of Fe. The NiFeX film comprises a plurality of layers, each layer comprising a first sublayer having a Re content of about 1 atomic percent to about 43 atomic percent and a second sublayer having a Re content of about 0 atomic percent to about 12 atomic percent. The NiFeX film increases the damping constant of the magnetic recording head.

Figure 1:
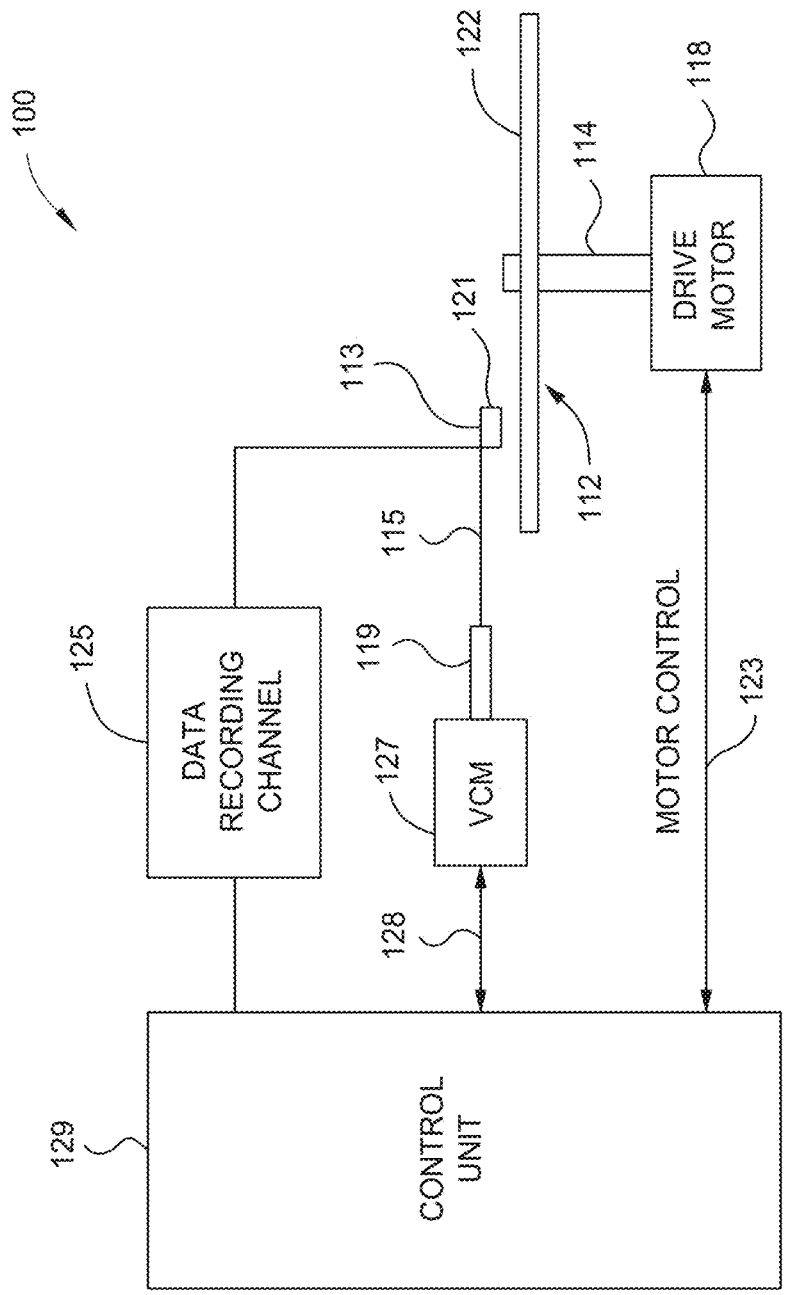
FIG. 1 illustrates a magnetic recording device embodying this disclosure.

FIG. 1 illustrates a magnetic recording device 100 embodying this disclosure. As shown, at least one rotatable magnetic media 112 is supported on a spindle 114 and rotated by a disk drive motor 118. The magnetic recording on each disk is in the form of any suitable pattern of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force that biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the magnetic recording device 100, the rotation of the magnetic media 112 generates an air bearing between the slider 113 and the media surface 122, which exerts an upward force or lift on the slider 113. The air bearing thus counter-balances the slight spring force of suspension 115 and supports slider 113 off and slightly above the media 112 surface by a small, substantially constant spacing during normal operation. In the case of EAMR, a DC magnetic field generated from an assist element of the magnetic head assembly 121 enhances the write-ability so that the write element of the magnetic head assembly 121 may efficiently magnetize the data bits in the media 112.

The various components of the magnetic recording device 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders. Also, it is to be understood that the embodiments discussed herein are applicable to a data storage device such as a hard disk drive (HDD) as well as a tape drive such as a tape embedded drive (TED) or an insertable tape media drive, such as those conforming to the LTO (Linear Tape Open) standards. An example TED is described in co-pending patent application titled "Tape Embedded Drive," United States Publication. No. 2020/0258544, filed Mar. 26, 2019, assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

Figure 2:
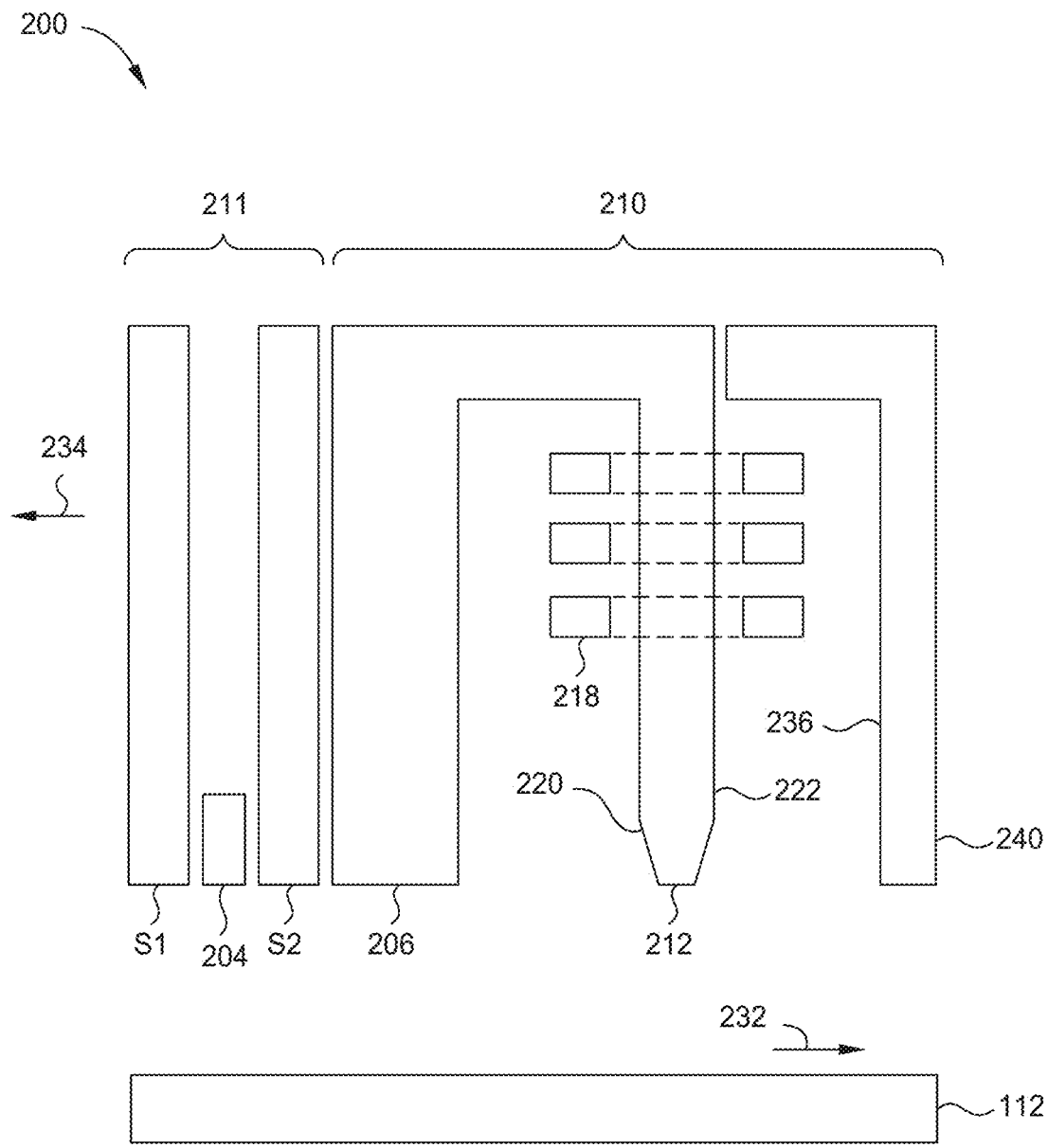
FIG. 2 is a fragmented, cross sectional side view through the center of a read/write head facing the magnetic media, according to one embodiment.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head. In FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap (not shown) and a leading gap (not shown) may be in contact with the main pole and a leading shield (not shown) may be in contact with the leading gap. A recording magnetic field is generated from the main pole 220 and the trailing shield 240 helps making the magnetic field gradient of the main pole 220 steep. The main pole 220 may be a magnetic material such as an FeCo alloy. The main pole 220 may include a trailing surface 222, which may be parallel to a leading surface 236 of the trailing shield 240. The main pole 220 may be a tapered write pole (TWP) with a trailing edge taper (TET) configuration. In one embodiment, the main pole 220 has a saturated magnetization (Ms) of 2.4 T and a thickness of about 300 nanometers (nm). The main pole 220 may comprise ferromagnetic materials, typically alloys of one or more of Co, Fe, and Ni.

Figures 3, 4A:
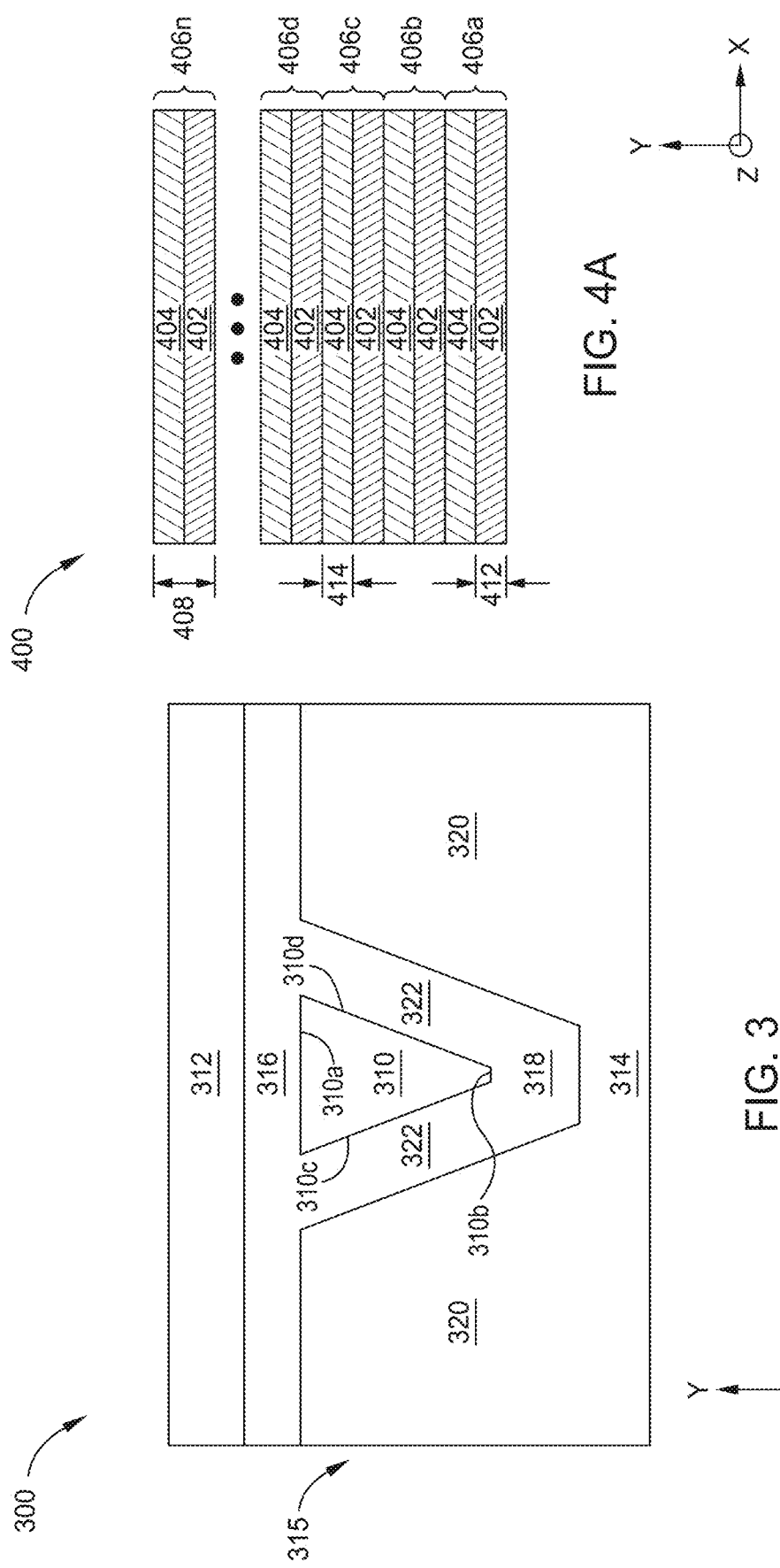
FIG. 3 illustrates a MFS view of a magnetic recording head, according to one embodiment.
FIG. 4A illustrates a laminated NiFeRe thin film structure, according to one embodiment.

FIG. 3 illustrates a media facing surface (MFS) view of a magnetic recording head 300, according to one embodiment. The magnetic recording head 300 may be the write head 210 of FIG. 2. The magnetic recording head 300 is within a magnetic recording device, such as the magnetic recording device 100 of FIG. 1.

The magnetic recording head 300 comprises a main pole 310 disposed between a trailing shield 312 and a leading shield 314 in the y-direction. The trailing shield 312 is disposed adjacent to a first surface 310a of the main pole 310, and the leading shield is disposed adjacent to a second surface 310b of the main pole 310. The first surface 310a is opposite the second surface 310b. The main pole 310 is further disposed between side shields 320 in the x-direction. The side shields 320 are disposed adjacent to a third surface 310c and a fourth surface 310d of the main pole 310, where the third surface 310c is opposite the fourth surface 310d. A trailing gap 316 is disposed between the first surface 310a of the main pole 310 and the trailing shield 312, and a leading gap 318 is disposed between the second surface 310b of the main pole 310 and the leading shield 314. Side gaps 322 are disposed between the third and fourth surfaces 310c, 310d of the main pole 310 and the side shields 320. The side shields 320, the leading shield 314, and the trailing shield 312 may collectively be referred to as a wrap-around shield 315. At least one or more of the side shields 320, the leading shield 314, and the trailing shield 312 comprise a laminated nickel (Ni), iron (Fe), X (NiFeX) thin film structure, where X is one of rhenium (Re), chromium (Cr), or iridium (Ir), as described in FIGS. 4A-4C. In other embodiments, at least one or more of the side shields 320, the leading shield 314, and the trailing shield 312 comprise a laminated cobalt (Co), Fe, X (CoFeX) thin film structure or a CoNiFeX thin film structure, where X is one of Re, Cr, or Ir. In some embodiments, the wrap-around shield 315 comprises the NiFeX film structure, the CoFeX film structure, or the CoNiFeX film structure.

FIG. 4A illustrates a laminated structure 400, according to one embodiment. The laminated structure 400 may be used to form the wrap-around shield 315 of FIG. 3, or at least one of the side shields 320, the leading shield 314, and the trailing shield 312 of FIG. 3. For example, the laminated structure 400 may be used to form the side shields 320 of FIG. 3. In some embodiments, the laminated structure 400 is used to form the side shields 320 and the leading shield 314 of FIG. 3. In other embodiments, the laminated structure 400 is used to form the side shields 320 and the trailing shield 312 of FIG. 3. The laminated structure may be a laminated NiFeX film structure, where X is one of Re, Cr, or Ir, a laminated CoFeX film structure, where X is one of Re, Cr, or Ir, or a laminated CoNiFeX film structure, where X is one of Re, Cr, or Ir. In other words, the laminated structure 400 may be one of NiFeRe, NiFeCr, NiFeIr, CoFeRe, CoFeCr, CoFeIr, CoNiFeRe, CoNiFeCr, and CoNiFeIr.

In one embodiment, a laminated structure 400 of NiFeX comprises about 1 atomic percent to about 12 atomic percent of X, about 30 atomic percent to about 50 atomic percent of Ni, and balance or remainder of Fe. In another embodiment, a laminated structure 400 of CoFeX comprises about 1 atomic percent to about 12 atomic percent of X, about 30 atomic percent to about 50 atomic percent of Co, and a balance or remainder of Fe. In yet another embodiment, a laminated of CoNiFeX comprises about 1 atomic percent to about 12 atomic percent of X, about 30 atomic percent to about 50 atomic percent of Ni, about 1 atomic percent to about 30 atomic percent of Co, and balance or remainder of Fe.

The laminated structure 400 comprises a plurality of layers 406a-406n, where each layer 406a-406n individually comprises a first sublayer 402 and a second sublayer 404. For example, a laminated NiFeX structure comprises a first NiFeX sublayer 402 and a second NiFeX sublayer 404, a laminated CoFeX structure comprises a first CoFeX sublayer 402 and a second CoFeX sublayer 404, and a laminated CoNiFeX structure comprises a first CoNiFeX sublayer 402 and a second CoNiFeX sublayer 404. As used herein, the first sublayer 402 may be referred to as a first NiFeX/CoFeX/CoNiFeX sublayer 402 and the second sublayer 404 may be referred to as a second NiFeX/CoFeX/CoNiFeX sublayer 404. The plurality of layers 406a-406n may be referred to as a plurality of cycles 406a-406n. Each layer 406a-406n has a thickness 408 in the y-direction of about 0.50 angstroms to about 500 angstroms. In some embodiments, each layer 406a-406n has a same thickness 408. In other embodiments, one or more layers 406a-406n may have a different thickness from one or more other layers 406a-406n.

The first NiFeX/CoFeX/CoNiFeX sublayer 402 of each layer 406a-406n is X-rich (e.g., has a high Re content, a high Cr content, or a high Ir content), while the second NiFeX/CoFeX/CoNiFeX sublayer 404 of each cycle or layer 406a-406n is X-poor (e.g., has a low Re content, a low Cr content, or a low Ir content). For example, the first NiFeX/CoFeX/CoNiFeX sublayer 402 has an X content between about 1 atomic percent to about 43 atomic percent, and the second NiFeRe sublayer 404 has an X content between about 0 atomic percent to about 12 atomic percent. To vary the X content of the first and second NiFeX/CoFeX/CoNiFeX sublayers 402, 404, the average current density is varied, as discussed in FIG. 4B below. As shown in FIG. 4A, each first sublayer 402 is in contact with one or more second sublayers 404, and is spaced from other first sublayers 402. Similarly, each second sublayer 404 is in contact with one or more first sublayers 402, and is spaced from other second sublayers 404. As such, the first sublayers 402 are not in direct contact with one another, and the second sublayers 404 are not in direct contact with one another. Rather, the laminated structure 400 comprises alternating first and second sublayers 402, 404.

The first sublayer 402 of each layer 406a-406n has a first thickness 412 in the y-direction of about 0.25 angstroms to about 400 angstroms, and the second sublayer 404 of each layer 406a-406n has a second thickness 414 in the y-direction of about 0.25 angstroms to about 400 angstroms. The first thickness 412 may be the same as the second thickness 414, or the first and second thicknesses 412, 414 may be different. The sum of a first thickness 412 and a second thickness 414 forms the thickness 408 of a layer 406a-406n. While each layer 406a-406n shows the second sublayer 404 being disposed on the first sublayer 402, the first sublayer 402 may be disposed on the second sublayer 404 instead.

To form the laminated structure 400, an electrolyte solution of Boric Acid is used as a pH buffer, which has a pH maintained between 2.0 to 3.5. The electrolyte solution may be adjusted with a $NH_4OH$ solution to increase the pH and a diluted $H_2SO_4$ solution to decrease the pH. The metal ions (i.e., NiFeX/CoFeX/CoNiFeX, where X is one of Re, Cr, or Ir) in the electrolyte solution are obtained by dissolution of appropriate metal salts. Saccharin is used as an organic additive to the electrolyte solution to reduce the stress of the plated film. Current is then applied to the electrolyte solution to electroplate and form the laminated structure 400. The current waveform is pulsed and pulse-reversed.

Table 1 below shows exemplary the chemicals and concentration of the electrolyte solution used to form the laminated structure 400 of NiFeRe.

TABLE 1

| Chemicals | Boric Acid | $Fe^{++}$ | $Ni^{++}$ | $Re^{7+}$ | Saccharin |
|---|---|---|---|---|---|
| Range of Concentration | 10 g/L to 30 g/L | 1 g/L to 15 g/L | 10 g/L to 120 g/L | 0.01 g/L to 0.3 g/L | 0 g/L to 3 g/L |

Figure 4B:
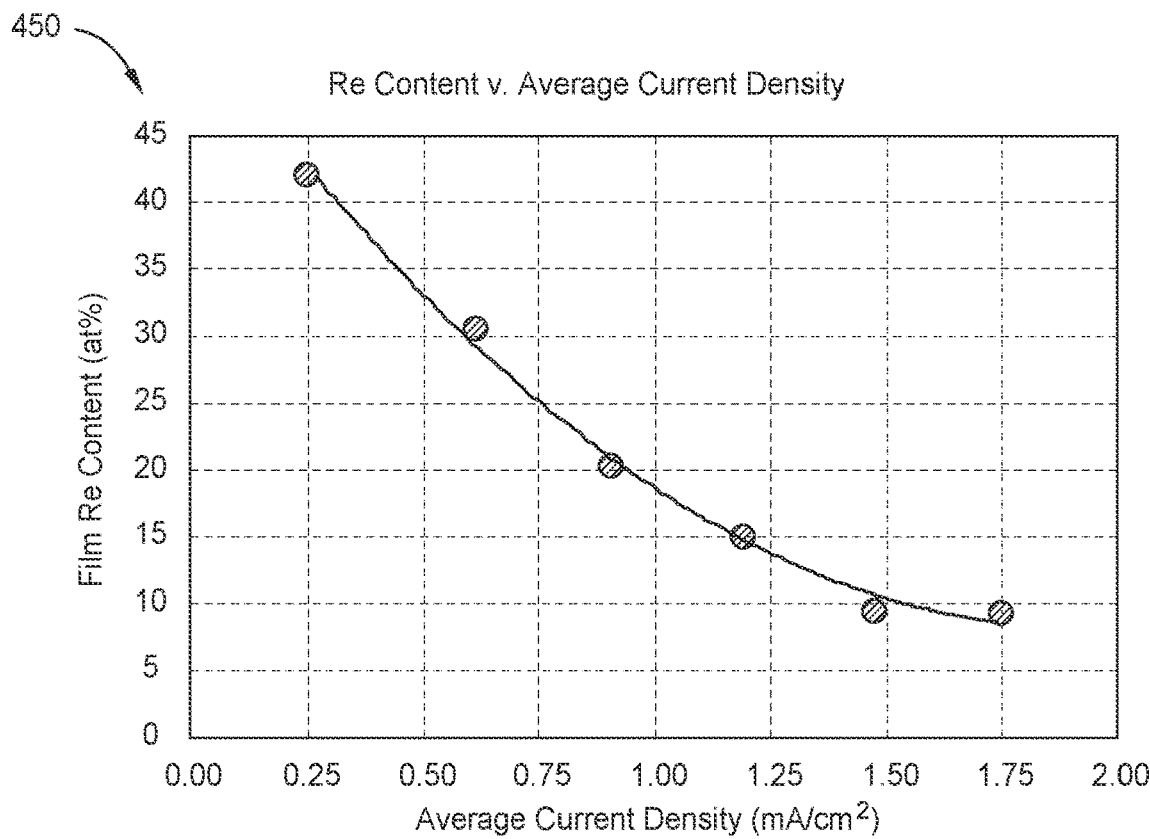
FIG. 4B illustrates a graph of Re content in atomic percent (at %) versus average current density in $mA/cm^2$ for the first and second NiFeRe sublayers of the laminated NiFeRe thin film structure of FIG. 4A, according to one embodiment.

FIG. 4B illustrates a graph 450 of Re content in atomic percent (at %) versus average current density in $mA/cm^2$ for the first and second sublayers 402, 404 of the laminated structure 400, according to one embodiment. In the graph 450, a laminated NiFeRe film is used as an example. However, the graph 450 may apply to laminated NiFeCr, NiFeIr, CoFeRe, CoFeCr, CoFeIr, CoNiFeRe, CoNiFeCr, and CoNiFeIr film structures as well. The average current density is the product of the peak current density and waveform duty cycle, where the waveform is pulsed and pulse-reversed. To produce the Re-rich layer (e.g., the first NiFeRe sublayer 402) of each cycle or layer 406a-406n, a lower average current density is utilized, such as between about 0.25 $mA/cm^2$ to about 0.80 $mA/cm^2$, resulting in a Re content between about 1 atomic percent to about 43 atomic percent. To produce the Re-poor layer (e.g., the second NiFeRe sublayer 404) of each cycle or layer 406a-406n, a higher average current density is utilized, such as between about 0.80 $mA/cm^2$ to about 1.75 $mA/cm^2$, resulting in a Re content between about 0 atomic percent to about 12 atomic percent.

Figure 4C:
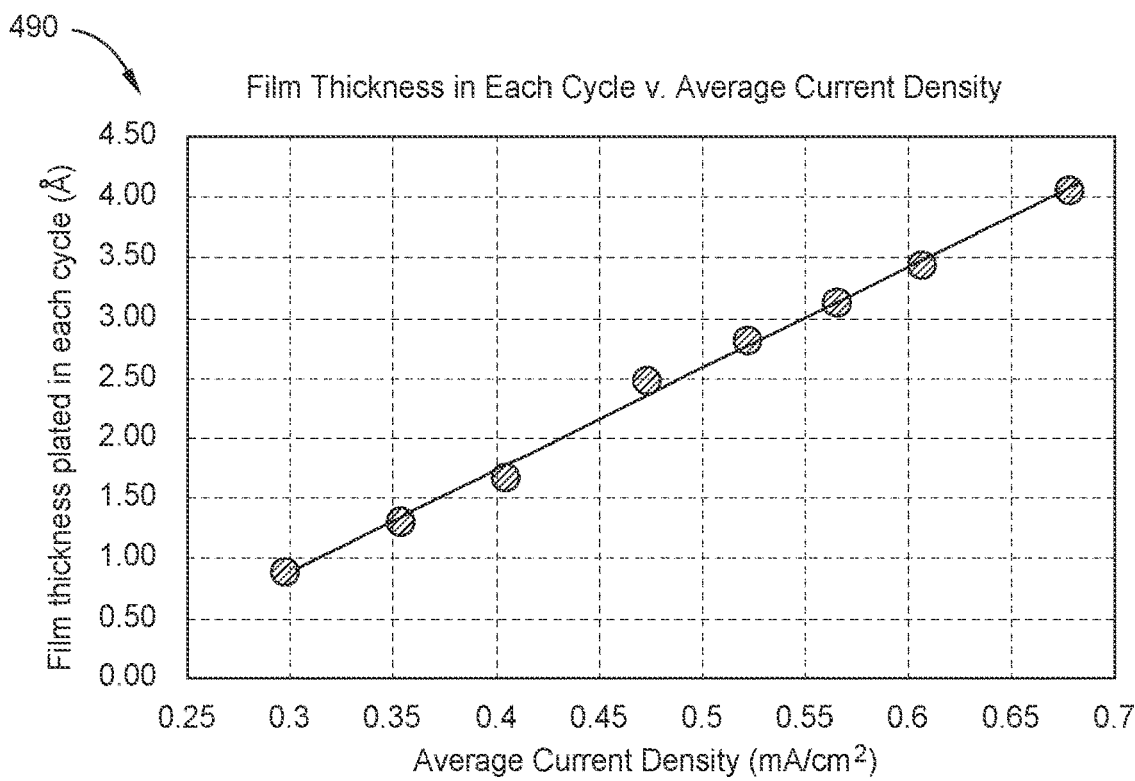
FIG. 4C illustrates a graph of film thickness of each layer in angstroms versus average current density in $mA/cm^2$ for the laminated NiFeRe thin film structure of FIG. 4A, according to one embodiment.

FIG. 4C illustrates a graph 490 of film thickness of each cycle or layer 406a-406n in angstroms versus average current density in $mA/cm^2$ for the laminated structure 400, according to one embodiment. In the graph 490, a laminated NiFeRe film is used as an example. However, the graph 490 may apply to laminated NiFeCr, NiFeIr, CoFeRe, CoFeCr, CoFeIr, CoNiFeRe, CoNiFeCr, and CoNiFeIr film structures as well.

The graph 490 illustrates that a smaller average current density results in a thinner cycle or layer 406a-406n and a higher average current density results in a thicker cycle or layer 406a-406n. For example, an average current density of about 0.30 $mA/cm^2$ produces a cycle or layer 406a-406n having a thickness of about 0.90 angstroms, an average current density of about 0.35 $mA/cm^2$ produces a cycle or layer 406a-406n having a thickness of about 1.40 angstroms, an average current density of about 0.48 $mA/cm^2$ produces a cycle or layer 406a-406n having a thickness of about 2.50 angstroms, an average current density of about 0.57 $mA/cm^2$ produces a cycle or layer 406a-406n having a thickness of about 3.15 angstroms, and an average current density of about 0.68 $mA/cm^2$ produces a cycle or layer 406a-406n having a thickness of about 4.05 angstroms. The number of cycles or layers 406a-406n of the laminated structure 400 depends on the thickness of each cycle or layer 406a-406n as well as the length of time of the electroplating to form each cycle or layer 406a-406n.

Figure 5:
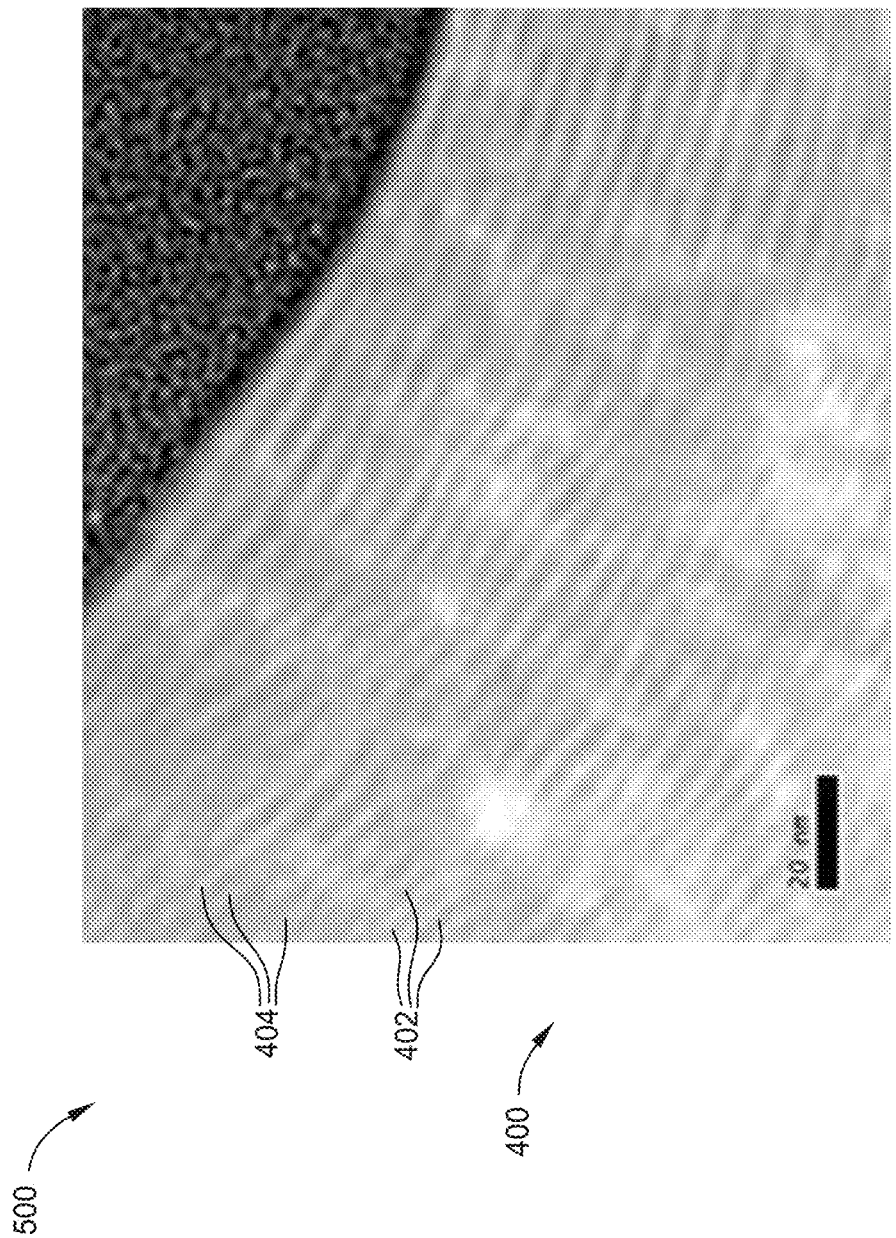
FIG. 5 is a transmission electron microscopy (TEM) image of the laminated NiFeRe thin film structure of FIG. 4A, according to one embodiment.

FIG. 5 is a transmission electron microscopy (TEM) image 500 of the laminated structure 400 of FIG. 4A where the laminated structure 400 is NiFeRe, according to one embodiment. In the TEM image, the darker colored layers are the first NiFeRe sublayers 402, or the Re-rich layers, and the lighter colored layers are the second NiFeRe sublayers 404, or the Re-poor layers. As shown in FIG. 5, each cycle or layer (i.e., the sum of a first NiFeRe sublayer 402 and a second NiFeRe sublayer 404) has a thickness of about 45 angstroms. While FIG. 5 illustrates a laminated NiFeRe structure, laminated NiFeCr, NiFeIr, CoFeRe, CoFeCr, CoFeIr, CoNiFeRe, CoNiFeCr, and CoNiFeIr structures have a similar design, with the Re, Cr, or Ir rich layers being darker than the Re, Cr, or Ir poor layers.

Figure 6:
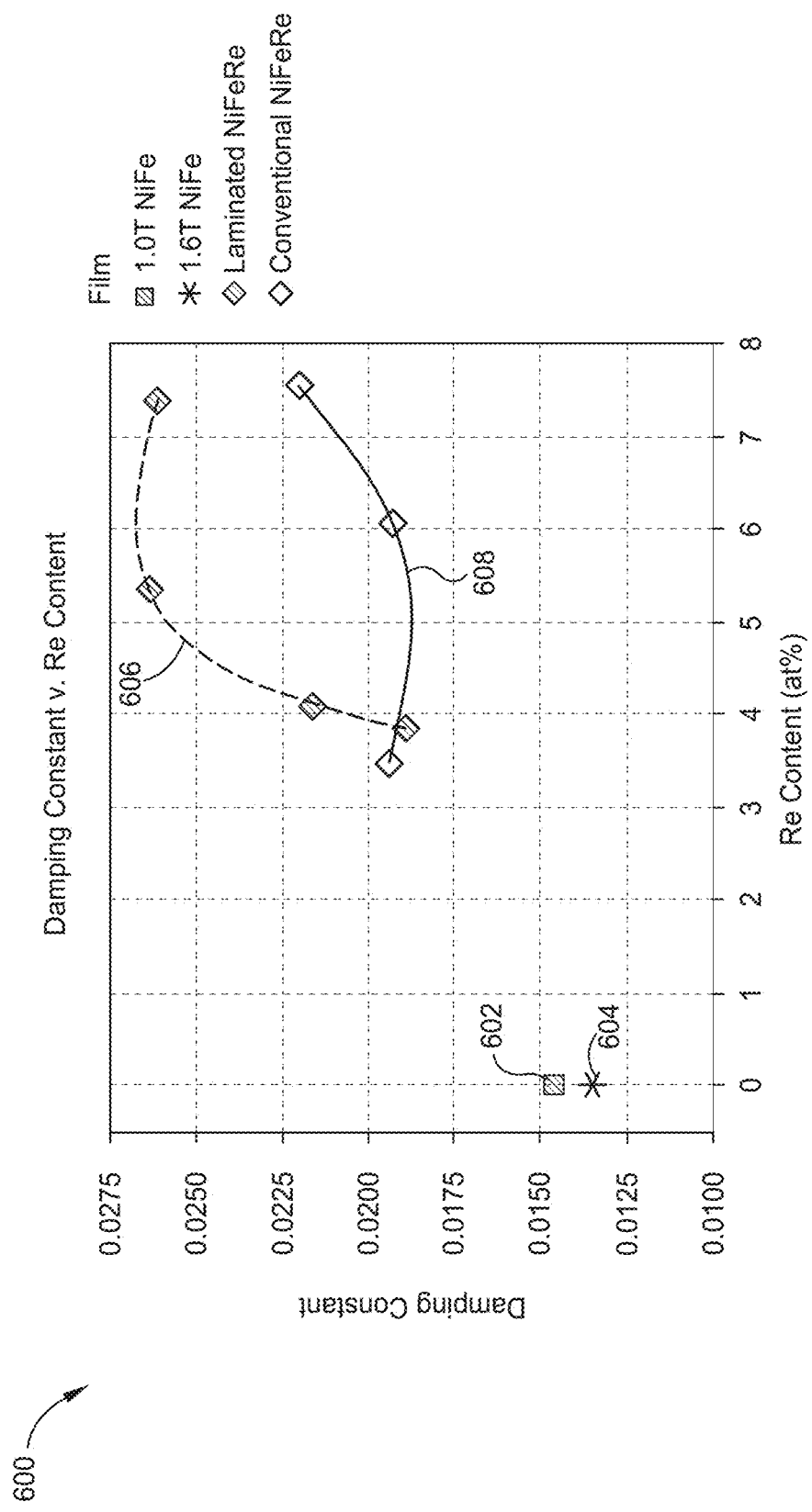
FIG. 6 illustrates a graph of the damping constant of various NiFe comprising films versus Re content in atomic percent for the various NiFe comprising films, according to one embodiment.

FIG. 6 illustrates a graph 600 of the damping constant of various NiFe comprising films versus Re content in atomic percent for the various NiFe comprising films, according to one embodiment. The various NiFe comprising films compared in the graph 600 may each individually be used as the material of the side shields of a magnetic recording head, such as the side shields 320 of FIG. 3. In the graph 600, point 602 represents a 1.0 T NiFe film, point 604 represents a 1.6 T NiFe film, line 606 represents examples of the laminated structure 400 of FIG. 4A where the laminated structure 400 is NiFeRe, and line 608 represents examples of a conventional, non-laminated NiFeRe film. As shown by the graph 600, the laminated NiFeRe structure 400 of FIG. 4A represented by line 606 has a higher damping constant than each of line 608, point 602, and point 604.

As such, the damping constant of the line 606 shown in the graph 600 demonstrate that examples of the laminated NiFeRe structure 400 offers better damping properties compared to those of conventional films, allowing a magnetic recording head 300 comprising the laminated NiFeRe structure 400 to avoid wide and narrow adjacent track erasure when writing data to a media.

FIG. 7A shows a TEM image 700 of the crystalline structure of the laminated structure 400 of FIG. 4A where the laminated structure 400 is NiFeRe, according to one embodiment. FIG. 7B shows a TEM image 750 of the crystalline structure of a conventional or non-laminated NiFeRe film, according to one embodiment. Comparing the TEM images 700, 750 of FIGS. 7A-7B, the TEM image 700 of the crystalline structure of the laminated NiFeRe structure 400 has a reduced grain size, a broken grain structure, and is overall more homogeneous than the TEM image 750 of the crystalline structure of a conventional NiFeRe film. While FIGS. 7A-7B illustrate a laminated NiFeRe structure, laminated NiFeCr, NiFeIr, CoFeRe, CoFeCr, CoFeIr, CoNiFeRe, CoNiFeCr, and CoNiFeIr structures have a crystalline structure.

Furthermore, since the laminated structure 400 is laminated, and thus, has an improved crystalline structure compared to conventional films, the X (i.e., Re, Cr, or Ir) of the laminated NiFeX/CoFeX/CoNiFeX structure 400 is uniformly distributed throughout, resulting in improved wrap-around conformity of the wrap-around shield. As such, gradient issues where the X is unevenly distributed, which occurs in conventional NiFeX/CoFeX/CoNiFeX films, are eliminated. Thus, side shields 320 of a magnetic recording head 300 comprising the laminated NiFeX/CoFeX/CoNiFeX structure 400 where X is one of Re, Cr, or Ir have X evenly and uniformly distributed throughout, improving adjacent track erasure performance characteristics.

In one embodiment, a magnetic recording head comprises a main pole, and a wrap-around shield surrounding at least two sides of the main pole, the wrap-around shield comprising a laminated film of NiFeX, CoFeX, or CoNiFeX, where X is one of Re, Cr, or Ir, wherein the laminated film comprises about 1 atomic percent to about 12 atomic percent of X, wherein when the laminated film is of NiFeX or CoNiFeX, the laminated film comprises about 30 atomic percent to about 50 atomic percent of Ni, and wherein when the laminated film is of CoFeX, the laminated film comprises about 30 atomic percent to about 50 atomic percent of Co.

The wrap-around shield comprises side shields disposed adjacent to a first surface of the main pole and a second surface of the main pole opposite the first surface. The wrap-around shield comprises a trailing shield disposed adjacent to a third surface of the main pole. The wrap-around shield comprises a leading shield disposed adjacent to a fourth surface of the main pole. The laminated film is formed by an electroplating process. The laminated film comprises a plurality of layers, each layer comprising a first sublayer and a second sublayer. The first sublayer has a higher X content than the second sublayer. The laminated film is NiFeRe. The laminated film comprises a plurality of layers, each layer comprising a first sublayer and a second sublayer. The first sublayer has a higher Re content than the second sublayer.

In another embodiment, a magnetic recording head comprises a main pole disposed at a media facing surface, and a wrap-around shield surrounding at least two sides of the main pole at the media facing surface, the wrap-around shield comprising a laminated film of NiFeX, CoFeX, or CoNiFeX, where X is one of Re, Cr, or Ir, wherein the laminated film comprises a plurality of layers, each layer comprising a first sublayer having a X content of about 1 atomic percent to about 43 atomic percent and a second sublayer having a X content of about 0 atomic percent to about 12 atomic percent, wherein the first sublayer has a higher X content than the second sublayer.

The laminated film is one of NiFeRe, CoFeRe, or CoNiFeRe. Each layer has an individual thickness between about 0.50 angstroms to about 500 angstroms. Each layer has a same thickness. The laminated film is formed by an electroplating process. The wrap-around shield comprises side shields disposed adjacent to a first surface of the main pole and a second surface of the main pole opposite the first surface, a leading shield disposed adjacent to a third surface of the main pole, and a trailing shield disposed adjacent to a fourth surface of the main pole. The wrap-around shield comprises side shields disposed adjacent to a first surface of the main pole and a second surface of the main pole opposite the first surface, and a leading shield disposed adjacent to a third surface of the main pole.

In another embodiment, a magnetic recording head comprises a main pole, a trailing shield disposed adjacent to a first surface of the main pole, a leading shield disposed adjacent to a second surface of the main pole opposite the first surface, and side shields disposed adjacent to a third surface of the main pole and a fourth surface of the main pole disposed opposite to the third surface, the side shields comprising a laminated film of NiFeX, CoFeX, or CoNiFeX, where X is one of Re, Cr, or Ir, wherein the laminated film comprises a plurality of layers, each layer comprising a first sublayer and a second sublayer, the first sublayer having a higher X content than the second sublayer, and wherein the first sublayers and the second sublayers alternate.

The first sublayer has an X content of about 1 atomic percent to about 43 atomic percent and the second sublayer has an X content of about 0 atomic percent to about 12 atomic percent. The laminated film is formed by an electroplating process. The laminated film comprises about 1 atomic percent to about 12 atomic percent of X and about 30 atomic percent to about 50 atomic percent of Ni. At least one of the leading shield and the trailing shield comprises the laminated film. Each first sublayer and each second sublayer has an individual thickness between about 0.25 angstroms to about 400 angstroms.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a main pole; and
   a wrap-around shield surrounding at least two sides of the main pole, the wrap-around shield comprising a laminated film of NiFeX, CoFeX, or CoNiFeX, where X is one of Re, Cr, or Ir,
   wherein the laminated film comprises about 1 atomic percent to about 12 atomic percent of X,
   wherein when the laminated film is of NiFeX or CoNiFeX, the laminated film comprises about 30 atomic percent to about 50 atomic percent of Ni,
   wherein when the laminated film is of CoFeX, the laminated film comprises about 30 atomic percent to about 50 atomic percent of Co, and
   wherein the laminated film comprises a plurality of layers, each layer comprising a first sublayer and a second sublayer such that the first and second sublayers alternate throughout the laminated film.

2. The magnetic recording head of claim 1, wherein the wrap-around shield comprises side shields disposed adjacent to a first surface of the main pole and a second surface of the main pole opposite the first surface.

3. The magnetic recording head of claim 1, wherein the wrap-around shield comprises a trailing shield disposed adjacent to a third surface of the main pole.

4. The magnetic recording head of claim 1, wherein the wrap-around shield comprises a leading shield disposed adjacent to a fourth surface of the main pole.

5. The magnetic recording head of claim 1, wherein the laminated film is formed by an electroplating process, and wherein the first sublayer has a higher X content than the second sublayer.

6. The magnetic recording head of claim 1, wherein the laminated film is NiFeRe, and wherein the first sublayer has a higher Re content than the second sublayer.

7. A magnetic recording device comprising the magnetic recording head of claim 1.

8. A magnetic recording head, comprising:
a main pole disposed at a media facing surface; and
a wrap-around shield surrounding at least two sides of the main pole at the media facing surface, the wrap-around shield comprising a laminated film of NiFeX, CoFeX, or CoNiFeX, where X is one of Re, Cr, or Ir, wherein the laminated film comprises a plurality of layers, each layer comprising a first sublayer having an X content of about 1 atomic percent to about 43 atomic percent and a second sublayer having an X content of about 0 atomic percent to about 12 atomic percent such that the first and second sublayers alternate throughout the laminated film, and wherein the first sublayer has a higher X content than the second sublayer.

9. The magnetic recording head of claim 8, wherein the laminated film is one of NiFeRe, CoFeRe, or CoNiFeRe.

10. The magnetic recording head of claim 8, wherein each layer has an individual thickness between about 0.50 angstroms to about 500 angstroms, and wherein each layer has a same thickness.

11. The magnetic recording head of claim 8, wherein the laminated film is formed by an electroplating process.

12. The magnetic recording head of claim 8, wherein the wrap-around shield comprises side shields disposed adjacent to a first surface of the main pole and a second surface of the main pole opposite the first surface, a leading shield disposed adjacent to a third surface of the main pole, and a trailing shield disposed adjacent to a fourth surface of the main pole.

13. The magnetic recording head of claim 8, wherein the wrap-around shield comprises side shields disposed adjacent to a first surface of the main pole and a second surface of the main pole opposite the first surface, and a leading shield disposed adjacent to a third surface of the main pole.

14. A magnetic recording device comprising the magnetic recording head of claim 8.

15. A magnetic recording head, comprising:
a main pole;
a trailing shield disposed adjacent to a first surface of the main pole;
a leading shield disposed adjacent to a second surface of the main pole opposite the first surface; and
side shields disposed adjacent to a third surface of the main pole and a fourth surface of the main pole disposed opposite to the third surface, the side shields comprising a laminated film of NiFeX, CoFeX, or CoNiFeX, where X is one of Re, Cr, or Ir, wherein the laminated film comprises a plurality of layers, each layer comprising a first sublayer and a second sublayer, the first sublayer having a higher X content than the second sublayer, and wherein the first sublayers and the second sublayers alternate throughout the laminated film.

16. The magnetic recording head of claim 15, wherein the first sublayer has an X content of about 1 atomic percent to about 43 atomic percent and the second sublayer has an X content of about 0 atomic percent to about 12 atomic percent.

17. The magnetic recording head of claim 15, wherein the laminated film is formed by an electroplating process, and wherein the second sublayer of the laminated film comprises about 1 atomic percent to about 12 atomic percent of X and about 30 atomic percent to about 50 atomic percent of Ni.

18. The magnetic recording head of claim 15, wherein at least one of the leading shield and the trailing shield comprises the laminated film.

19. The magnetic recording head of claim 15, wherein each first sublayer and each second sublayer has an individual thickness between about 0.25 angstroms to about 400 angstroms.

20. A magnetic recording device comprising the magnetic recording head of claim 15.

* * * * *